United States Patent

[11] 3,634,029

| [72] | Inventor | Robert Amanrich |
| | | Toulouse, France |
| [21] | Appl. No. | 774,136 |
| [22] | Filed | Nov. 7, 1968 |
| [45] | Patented | Jan. 11, 1972 |
| [73] | Assignee | Office Nationale Industriel De L'Azote |
| | | Toulouse, France |
| [32] | Priorities | Nov. 7, 1967 |
| [33] | | France |
| [31] | | 127142; |
| | | Nov. 25, 1967, France, No. 129131 |

[54] PRODUCTION OF FEED GRADE DICALCIUM PHOSPHATE FROM MIXTURES OF PHOSPHORIC AND NITRIC ACIDS
11 Claims, 1 Drawing Fig.

[52] U.S. Cl. .................................................. 23/109, 23/304, 71/43
[51] Int. Cl. ................................................... C01b 25/32
[50] Field of Search ........................................ 23/109, 304; 71/43

[56] References Cited
UNITED STATES PATENTS
| 1,834,454 | 12/1931 | Johnson ........................ | 23/109 |
| 2,906,602 | 9/1959 | Purvis ........................... | 23/109 |
| 3,446,583 | 5/1969 | De Rooij et al. ............... | 23/109 |
| 3,467,495 | 9/1969 | Nielsson ........................ | 23/109 X |

FOREIGN PATENTS
| 1,089,681 | 11/1967 | Great Britain ................ | 23/109 |
| 1,093,805 | 12/1960 | Germany ...................... | 23/109 |

Primary Examiner—Oscar R. Vertiz
Assistant Examiner—Charles B. Rodman
Attorney—Wenderoth, Lind & Ponack ABSTRACT: Feed grade dicalcium phosphate is produced from mixtures of phosphoric and nitric acids wherein the $H_3PO_4/HNO_3$ molar proportion ranges from 0.5 to 9.0, the phosphate being precipitated by means of a calcium compound, with addition of ammonia to keep the pH at 6 to 7, in the presence of 5 to 35 percent, desirably 10 to 25 percent, by weight of $C_1$ to $C_8$ aliphatic alcohol(s). The invention can be applied to solutions produced by extraction by means of $C_1$ to $C_8$ aliphatic alcohol(s) resulting from the decomposition of natural phosphates with nitric acid, and the extraction and the dicalcium phosphate production stages can be carried out concomitantly.

PATENTED JAN 11 1972
3,634,029
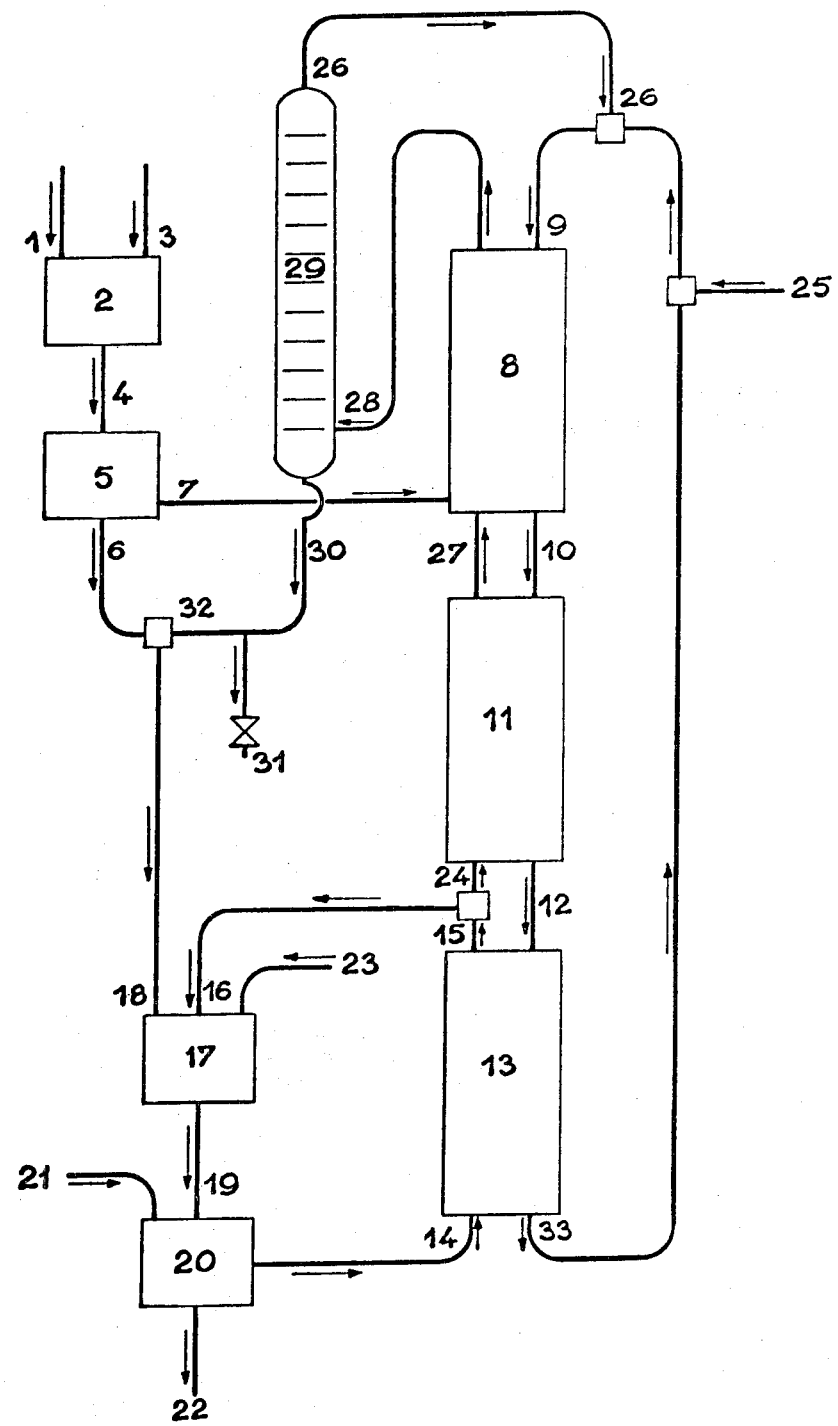
ROBERT MAHRICH, Inventor
BY Wenderoth, Lind & Ponack
Attorneys

PRODUCTION OF FEED GRADE DICALCIUM PHOSPHATE FROM MIXTURES OF PHOSPHORIC AND NITRIC ACIDS

The present invention relates to a process for the production of feed grade dicalcium phosphate with contents of fluorides, nitrates, sulphates, chlorides, arsenates etc., limited to concentrations well below the level of toxicity.

Precipitation as dicalcium phosphate of phosphoric ion present in phosphonitric mixtures by means of a calcium compound has already been tried for this purpose. Operating conditions such as molal ratio $CaO:P_2O_5$ of about 2 and pH adjustment to 6–7 by addition of ammonia have been required to achieve quantitative separation of phosphoric ion. The product thus obtained, however, is contaminated with ammonium nitrate and ammonium-calcium phosphate ($CaNH_4PO_4$), unavoidable coprecipitation of which increases as the starting acid mixture is poorer in phosphoric acid.

The process of the present invention makes it possible to overcome such drawback. It consists essentially in carrying out precipitation in the presence of 5 percent to 35 percent and advantageously 10 to 25 percent by weight of primary, secondary and/or tertiary aliphatic alcohols, severally or in admixture, containing one to eight carbon atoms in the molecule. Under these conditions, feed grade disclaim phosphate is produced containing less than 10 p.p.m. of arsenic and heavy metals, with high degree of purity especially for starting acid mixtures containing a molal ratio $H_3PO_4:HNO_3$ below 10. The recovery of phosphoric ion initially present exceeds 98 percent.

The technical progress provided by the invention is brought out by the comparative results achieved by treating various phosphonitric mixtures with molal ratios $H_3PO_4:HNO_3$ ranging from 0.5 to about 9.0 in the absence of a solvent and in the presence of isobutanol, and appearing in the following table:

| $H_3PO_4$ weight percent | Initial system molal ratio ($H_3PO_4$: $HNO_3$) | Isobutanol, weight percent | Residual nitrogen (weight percent) | |
|---|---|---|---|---|
| | | | Nitrate nitrogen | Ammonia nitrogen |
| 11.0 | 0.5 | 0 | 5.30 | 7.00 |
| | | 17–19.0 | 3.80 | 4.45 |
| 17.2 | 0.8 | 0 | 3.72 | 5.00 |
| | | 18–24.0 | 1.37 | 2.37 |
| 7.0 | 1.13 | 0 | 2.50 | 2.75 |
| | | 12.5–15.0 | 0.50 | 0.92 |
| 12.0 | 2.2 | 0 | 1.37 | 1.6 |
| | | 14.5–16.0 | 0.50 | 0.57 |
| 22.0 | 8.8 | 0 | 0.30 | 1.40 |
| | | 14.0–16.0 | 0.23 | 0.50 |

These results establish that the process of this invention makes it possible to obtain dicalcium phosphate containing markedly less nitrate and ammonium ions than results from the use of former methods mainly with starting mixtures of molal ratio $H_3PO_4:HNO_3$ ranging between 0.8 and 8.0.

The separation process which is the object of this invention is applicable generally to any phosphonitric mixture of whatever origin with molal ratio $H_3PO_4:HNO_3$ desirably below 9.0. It is advantageously used where solutions resulting from nitric decomposition of natural phosphates, and which may have been treated to lower lime content, are available. It is applicable to nitrophosphoric solutions subjected to extraction with solvents in the presence of primary, secondary and/or tertiary $C_2$ to $C_8$ aliphatic alcohols, alone or in admixture. In the latter case, the extraction treatment by means of alcoholic solvents from acid solutions and, more particularly, those resulting from nitric decomposition of natural phosphates, and which may have been freed, by crystallization, of part of the calcium nitrate tetrahydrate contained therein, is concomitant with the treatment of the phosphoric extract in alcoholic medium with a calcium salt in the presence of ammonium nitrate.

According to one of the embodiments of the present invention, only a fraction of the extract purified and separated from the greater part of the alcoholic solvent contained therein is subjected to neutralization by calcium compound in the presence of ammonia. The remaining part is recycled to the process wherein it serves to wash the crude extract from the liquid-liquid extraction stage of the nitric decomposition medium of the natural phosphates.

According to another embodiment, there is used, to precipitate dicalcium phosphate, a portion of calcium nitrate tetrahydrate obtained by crystallization from the nitric decomposition medium of natural phosphates. The filtrate and washings of the dicalcium phosphate precipitate are advantageously recycled to the extraction process wherein they serve as a reextraction solution.

Of the three following examples of embodiment, the last refers to the diagrammatic drawing annexed to the present specification. These are merely illustrations of the invention for better understanding of the economic interest and technical progress afforded by the same, it being understood, of course, that the scope of the invention is not limited to the nature of the alcoholic solvent and calcium salt used, or to the proportion of calcium nitrate tetrahydrate crystallized out of the decomposition medium etc., or to the amounts of recycled and drawn off products, etc. Percentages are by weight.

EXAMPLE 1

250 kg. of methanol and then, while stirring, 175.5 kg. of calcium carbonate and lastly 58 kg. of ammonia to bring down the pH value to the 6–6.5 range, are added to 1 ton (t) of aqueous solution assaying 17.2 percent by weight of phosphoric acid and 21.50 percent by weight of nitric acid. The filtered precipitate is composed of 362.4 kg. of dicalcium phosphate dihydrate which after drying gives 249 kg. of dicalcium phosphate with 1.4 percent nitrate nitrogen and 2.4 percent ammonia nitrogen.

EXAMPLE 2

To 1 ton of aqueous solution assaying 7.0 percent $H_3PO_4$ and 6.2 percent of $HNO_3$ by weight there are added 137 kg. of n-heptanol and then, while stirring thoroughly, 71.5 kg. of calcium carbonate and the ammonia required to bring down the pH value to about 6.5.

The final system with three phases: alcoholic, aqueous and solid is decanted, then filtered. The solid product in the dry state represents 101 kg. of dicalcium phosphate whereof the ammonia nitrogen content and nitrate nitrogen content are 0.9 percent and 0.5 percent respectively.

EXAMPLE 3

Moroccan natural phosphate serving as an ore in the production of feed grade dicalcium phosphate according to the invention has the following composition:

| | | | |
|---|---|---|---|
| $P_2O_5$ | 35% | $SiO_2$ (combined) | 3.20% |
| CaO | 54% | F | 4.20% |
| MgO | 0.72% | $CO_2$ | 1.32% |
| $Al_2O_3$ az $Fe_2O_3$ | 0.60% | $SO_3$ | 1.30% |

Referring to the diagrammatic drawing annexed to the specification, showing an apparatus to put the invention into practice, 3.05 t/hr. (tons per hour) of ore are fed at 1 into decomposition vessel 2 simultaneously fed at 3 with 7.30 t/hr. of 57 percent nitric acid. The medium is kept at 80° C., a portion of the fluorine and silica being removed, under these conditions as fluosilicic acid $H_2SiF_6$ or silicon fluoride $SiF_4$.

There are thus obtained, at 4, 10.20 t/hr. of acid solution which is cooled to about +10° C. in crystallization and dewatering device 5.

The 4.41 t/hr. of tetrahydrated calcium nitrate collected at 6 and been previously washed with a fraction of the nitric acid used in 3 for the decomposition, in an apparatus not shown. They contain 0.035 t of $P_2O_5$. The 5.83 t/hr. of mother liquors drawn off simultaneously at 7 contain:

1.035 t of $P_2O_5$
1.050 t of $Ca(NO_3)_2$
0.160 t of $HNO_3$
0.022 t of MgO 0.018 t of $Al_2O_3 + Fe_2O_3$
0.080 t of $SiO_2$
0.088 t of (combined) fluorine
0.030 t of $SO_3$ They are fed into liquid-liquid extraction battery 8, fed at 9 with 50.6 t/hr. of solvent containing:
44.53 t of $C_5$ primary alcohols (OXO alcohols)
1.43 t of $HNO_3$
0.99 t of $NH_4NO_3$
3.65 t of water.

The 53 t/hr. of crude extract leaving battery 8 at 10 contain the whole of the phosphoric acid, the major part of the nitric acid, 0.110 t of calcium nitrate and 0.010 t of combined fluorine. This crude extract is purified in a second extraction battery 11 in contact with a nitrophosphoric aqueous solution containing ammonium nitrate fed in through 24. Purified extract 12 freed from almost all impurities thereof is fed at the rate of 54.5 t/hr. into a third liquid-liquid extraction battery 13 wherein it is treated in countercurrent to an aqueous solution 14 from the filtration and washing of the final dicalcium phosphate and containing 4.14 t/hr. of ammonium nitrate together with 1.05 t of OXO alcohol.

During this operation, the phosphoric acid and the remainder of the nitric acid pass into aqueous solution, and the purified extract is separated from the major part of the alcohol contained therein.

A product containing 1.96 t of $P_2O_5$ and 0.314 t of $HNO_3$ is thus obtained at 15. About one-half of this solution (or 10.97 t/hr.) is passed through 16 into neutralizer 17 fed at 18 with 3.38 t/hr. of calcium nitrate tetrahydrate from 6; the pH value of the medium is brought down to 7 by adding ammonia at 23.

The dicalcium phosphate precipitates and is fed through 19 into filter 20 wherein the precipitate is washed with 4.61 t/hr. of water from 21.

At 22, 2.84 t/hr. of $CaHPO_4 \cdot 2H_2O$ are collected which contain, after drying and dehydration, 1.88 t/hr. of $CaHPO_4$. The product has the following composition:

| | | | |
|---|---|---|---|
| $P_2O_5$ | 52.10% | F (combined) | 0.0025% |
| CaO | 41.10% | As | 0.0008% |
| $N_2$ (ammonia) | 0.10% | Heavy metals | 0.0006% |

The 16.6 t/hr. of filtrate and washings are admitted through 14 into a third extraction battery 13 as indicated supra. The organic phase leaving said third extraction battery at 33 at the rate of 49.53 t/hr. contains 0.99 t of $HNO_3$ and 0.99 t of $NH_4NO_3$. This phase, mixed with 0.77 t of 57% $HNO_3$ at 25 and with 0.30 t of OXO alcohols at 26, constitutes the extraction solvent fed at 9 into the first liquid-liquid extraction battery.

The nitrophosphoric aqueous solution leaving the third extraction battery 13 at 15 is divided into two parts as indicated above, the first being treated with a view to the separation of the dicalcium phosphate.

The second part, at the rate of 10.6 t/hr. and containing 0.154 t/hr. of $HNO_3$ and 1.55 t of $NH_4NO_3$, is admitted at 24 into purification battery 11 in which it washes the crude extract. The 9.10 t/hr. of heavy phase formed under these conditions, carrying in addition to the phosphoric and nitric acids, 0.110 t of $Ca(NO_3)_2$ and 0.010 t of fluorine compounds (expressed as fluorine), is fed at 27 into extraction section 8 wherein it is mixed with mother liquors.

The resulting raffinate contains:

0.035 t of $P_2O_5$
1.050 t of $Ca(NO_3)_2$
0.088 t of (combined) F
2.54 t of $NH_4NO_3$ 0.022 t of MgO
0.018 t of $Al_2O_3 + Fe_2O_3$
0.080 t of $SiO_2$
0.030 t of $SO_3$ It is fed at 28 into distillation column 29, from which 0.30 t/hr. of OXO alcohols is recovered and recycled at 26 into extraction solvent circuit 9.

The 12.33 t/hr. of raffinate separated from the alcohol drawn off at 30 are added at 31 to the excess calcium nitrate tetrahydrate 32 not used by neutralizer 17.

There are thus obtained, at 31, 12.26 t/hr. of a mixture containing 1.76 t of $Ca(NO_3)_2$ and 2.54 t/hr. of $NH_4NO_3$, which is concentrated and granulated to make nitro-calcium fertilizer.

It is also possible to treat this mixture with carbon dioxide and ammonia, then, after filtering calcium carbonate, to concentrate the ammonium nitrate solution thus obtained.

What is claimed is:

1. In a method for precipitating dicalcium phosphate from a mixture of phosphoric acid and nitric acid containing calcium ions wherein the $H_3PO_4/HNO_3$ molar ratio is between 0.5 and 9.0, the $CaO/P_2O_5$ molar ratio is about 2 and ammonia is added to maintain the pH at 6 to 7, the improvement which comprises conducting said precipitation in the presence of 5 to 35 weight percent of an aliphatic alcohol containing one to eight carbon atoms in the molecule.

2. A method according to claim 1, wherein the phosphoric acid-nitric acid mixture is the product of nitric acid decomposition of natural phosphate.

3. A method according to claim 1, wherein the amount of aliphatic alcohol present in the reaction mixture is in the range from 10 to 25 percent by weight.

4. A method according to claim 1, wherein the $H_3PO_4/HNO_3$ molar proportion is between 0.8 and 8.0.

5. A method according to claim 1, wherein said aliphatic alcohol is in the form of a mixture of alcohols with one to eight carbon atoms in the molecule.

6. A method according to claim 1, wherein said mixture of acids is in the form of an extract solution produced by liquid-liquid extraction of said mixture by means of aliphatic alcohol containing one to eight carbon atoms in the molecule, the production of the dicalcium phosphate according to claim 1 being carried out concomitantly with the said extraction.

7. A method according to claim 1 wherein said calcium compound is calcium carbonate.

8. A method according to claim 1 wherein said calcium compound is calcium nitrate.

9. A method according to claim 1 in which phosphate ore is attacked by nitric acid, in order to obtain a solution containing nitric acid, phosphoric acid and calcium ions, the solution obtained is extracted by means of an aliphatic alcohol containing one to eight carbon atoms in order to obtain an extract containing nitric acid, phosphoric acid and a small quantity of calcium nitrate, part of the alcohol from the alcoholic extract is separated in order to adjust the alcoholic concentration between 5 to 35 and the alcoholic solution obtained is ammoniated up to a pH of 6 to 7.

10. A process according to claim 9 in which the alcoholic extract containing nitric acid, phosphoric acid and calcium nitrate is purified, the purified extract is reextracted with water in order to separate part of the alcohol and a calcium compound added to a fraction of the purified reextracted extract in order to adjust the molar ratio $CaO/P_2O_5$ to about 2, and the remaining alcoholic extract containing the nitric acid, phosphoric acid and calcium nitrate fraction is recycled to a purification zone.

11. A process according to claim 10 in which part of the calcium nitrate contained in the solution obtained by attacking phosphate ore by nitric acid is separated by refrigeration and crystallization and a fraction of this calcium nitrate is added to the purified, reextracted extract as calcium compound.

* * * * *